(12) United States Patent
Ling et al.

(10) Patent No.: US 7,477,602 B2
(45) Date of Patent: Jan. 13, 2009

(54) ESTIMATOR FOR END-TO-END THROUGHPUT OF WIRELESS NETWORKS

(75) Inventors: Yibei Ling, Belle Mead, NJ (US); Jasmine Chennikara, Somerset, NJ (US); Wai Chen, Parsippany, NJ (US); Onur Altintas, Florham Park, NJ (US)

(73) Assignees: Telcordia Technologies, Inc., Piscataway, NJ (US); Toyota Infotechnology Center, U.S.A., Inc., Palo Alto, CA (US)

( * ) Notice: Subject to any disclaimer, the term of this patent is extended or adjusted under 35 U.S.C. 154(b) by 618 days.

(21) Appl. No.: 10/815,605

(22) Filed: Apr. 1, 2004

(65) Prior Publication Data

US 2005/0220035 A1 Oct. 6, 2005

(51) Int. Cl.
*G01R 31/08* (2006.01)
*H04L 12/28* (2006.01)

(52) U.S. Cl. .................. 370/232; 370/253; 370/395.21; 370/401

(58) Field of Classification Search .................. 370/203, 370/229, 230, 231, 232, 233, 234, 235, 236.1, 370/236.2, 241, 241.1, 252, 253, 395.21, 370/395.41
See application file for complete search history.

(56) References Cited

U.S. PATENT DOCUMENTS

| 5,913,041 | A | 6/1999 | Ramanathan et al. |
| 7,099,954 | B2 * | 8/2006 | Li et al. ........................ 709/233 |
| 2001/0038610 | A1 * | 11/2001 | Decker et al. ................ 370/230 |
| 2003/0018794 | A1 * | 1/2003 | Zhang et al. ................. 709/231 |

* cited by examiner

*Primary Examiner*—Seema S Rao
*Assistant Examiner*—Christine Duong
(74) *Attorney, Agent, or Firm*—Philip J. Feig

(57) ABSTRACT

The present invention presents an architecture to dynamically measure and estimate the throughput perceived by a user during a connection in real-time in a wireless network system. The architecture system design of the present invention allows for information gathering independent of the mathematical models used and takes into account security settings in the network hosts. The present invention also sets forth a number of throughput estimators (TEs) that can be used within the architecture to gather the information needed to carry out the throughput estimation calculations. The throughput estimations can then be used for download rate control, QoS, load balancing, etc. The present invention also provides algorithms to calculate the real-time throughput experienced by a user flow.

5 Claims, 1 Drawing Sheet

ESTIMATOR FOR END-TO-END THROUGHPUT OF WIRELESS NETWORKS

FIELD OF THE INVENTION

The present invention relates to network throughput estimation, which is an essential component in predicting network throughput for purposes of Quality of service (QoS) management, service prioritization, and load balancing. The present invention provides an architecture design of a real-time bandwidth-aware wireless middleware system, with the focus on the end-to-end throughput measurement between a mobile host and an Information Gateway (IGW). The present invention also provides algorithms for calculating the estimated throughput.

BACKGROUND

Many applications, such as streaming video, send packets at pre-determined nominal service rates. However, the actual throughput or receiving rate at mobile systems (hosts) is highly sensitive to changing network conditions and influenced by several factors, including available bandwidth. The throughput experienced by mobile hosts in wireless networks is further impacted by background noise due to constant location and topology changes, frequent handoff across base stations (radio cells), wireless signal fading and interference as well as to the inherent network infrastructure fluctuations, such as network load, large numbers of users, policing of packets and link utilizations. In order to utilize the available network resources, mobile users need the ability to adjust their behavior to highly fluctuating network conditions. This is especially critical in providing reasonable quality for real-time services such as video and web-browsing. To achieve this goal, mobile hosts need to accurately and reliably measure and estimate the run-time available network capacity.

The Throughput Estimator (TE) is considered an indispensable component of system architecture for accurately determining the throughput available to applications and for providing feedback to mechanisms that adapt service rates to network conditions. The need to include the TE component in the system architecture is also driven by QoS demands. A reliable and accurate estimate of network condition is crucial for maintaining adequate levels of services, and could be used as a threshold for admission control for differentiated services and for pre-allocation of resources.

TEs for wired networks place their emphasis on measuring and estimating physical link and network capacity characteristics, such as physical network latency and bandwidth. TEs for wired networks usually send a large set of data probes (packets) of different sizes, and measure round trip time (RTT) between source and destination. This approach focuses on estimating total available network capacity and provides estimates of network characteristics by using appropriate mathematical treatments to extract the useful information from obtained data and filtering out (reducing) noise. Research on throughput estimation for wired networks focuses on how to derive accurate and reliable TEs while minimizing the associated traffic overhead and on various mathematical models for processing the obtained data. These methods have several drawbacks when used for real-time throughput control for mobile users. In particular, the characteristics of the network are determined from statistics gathered during non-busy times, whereas the capacity or power to a wireless user varies depending on distance, the physical environment and geographic topology. Further, wireline algorithms assume that the reverse and forward channels capacities are equal, but this may not be true in wireless networks. Moreover, using schemes based on ping packets requires synchronization between users and networks to properly measure round trip times and one-way trip times, which may not be feasible in a wireless mobile network.

Other estimation techniques have been proposed in the field of traffic modeling including effective bandwidth modeling, self-similar traffic modeling, and handoff reservation modeling, to approximate the required capacity of a connection in order to reserve resources or perform admission control for a flow. In these techniques, the total network capacity is fixed but the behavior of the connection may change due to the nature of the application or congestion in the network. These methods are used for reservation of bandwidth but do not provide real-time throughput estimates.

Providing and managing diversified user needs and dynamic QoS adaptation to the available network resources becomes more difficult in the highly fluctuating environment that is characteristic of wireless networks. Known TEs for wireless networks estimate the available network capacity and studies thereof fall into two categories, i.e. system perceived performance and mobile user perceived performance. System perceived performance can be measured in terms of speed and response time as well as system availability, reliability and scalability. The workload for systems (middleware) in the wireless networks is characterized by requests from mobile hosts for long sessions but relatively short message sizes. The workload characteristic of wireless systems is due to the low bandwidth and long latency characteristics of the current wireless infrastructure. In a real application, the communication between network server and a mobile host is influenced by wireless bandwidth which is vulnerable to constant disruption due to unevenly distributed coverage and movement of the mobile host. Therefore, user perceived performance is measured in an end-to-end fashion, which cannot directly be derived from system perceived performance. A reliable and accurate throughput estimator is a desirable system component for its ability to predict the time elapsed in serving a request. The obtained information in turn can be used to determine whether the incoming request is accepted or not based on its service level and the overall system conditions.

Implicit real-time throughput estimation per user for an ongoing connection has been utilized by transport protocols such as TCP and RTCP. In RTCP the sender uses the current and previous values of loss and delay reported by the receiver to estimate bandwidth and appropriately decrease, increase or maintain the current sending rate to reflect the over-loaded, under-loaded or loaded states of the network, respectively. In TCP the reduction of the window size, i.e. reduced sending rate, occurs when acknowledgements are not received before time-out, based on the assumption that the lack of acknowledgement indicates packet loss and therefore network congestion. Once packet acknowledgements are received in a timely fashion, the assumption is that throughput is available to the user and TCP starts to increase its window size, or sending rate, to reflect the resource availability in the network. TCP inherently does not work well in the lossy environment of wireless networks. If high packet loss occurs, TCP assumes the network is congested and dramatically reduces the sending throughput. In actuality, higher throughput may be available.

There remains a need in the art for improvements in the technology of throughput estimation, particularly in for wireless networks.

SUMMARY

The present invention presents an architecture to dynamically measure and estimate the throughput perceived by a user during a connection in real-time. The architecture system design of the present invention allows for information gathering independent of the mathematical models used. In particular, the present invention provides an application-layer approach, which is not dependent on any one transport protocol. By providing an application-layer solution that can work in conjunction with lower layer solutions such as TCP, it is possible to provide additional measuring and control on the throughput. This leads to less drastic changes in the TCP throughput due to the changing wireless bandwidth and also provides more efficient usage of the actual wireless bandwidth. Further, the present invention gives bi-directional throughput estimation by allowing for the throughput calculation at either a gateway located in the backbone network or in the mobile host. The present invention also takes into account various security settings, such as firewall and VPN currently employed, which may create a hindrance in obtaining throughput information.

The present invention also sets forth a number of TEs that can be used within the architecture to gather the information needed to carry out the throughput estimation calculations. The information gathered by these TEs can be used for download rate control, QoS, load balancing, etc. For example, these TEs can be used in an application-layer run-time throughput estimation and download control solution to provide control for applications experiencing varying throughput conditions because of movement, wireless environment and network loading. In addition, the present invention provides algorithms to calculate the real-time throughput experienced by a user flow.

DETAILED DESCRIPTION OF THE DRAWINGS

Figure 1:
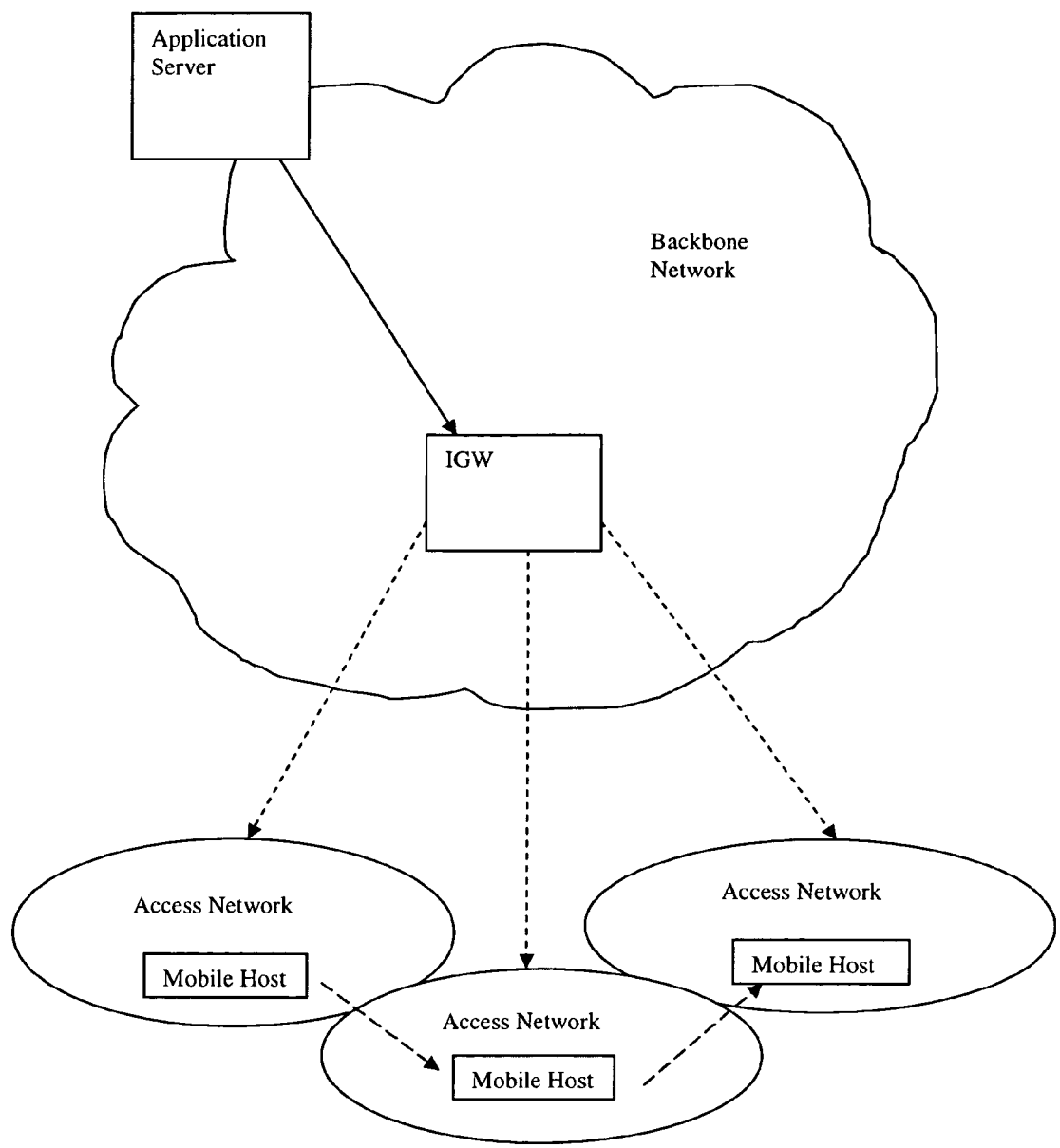
FIG. 1 depicts a system architecture according to one embodiment of the present invention.

The present invention provides an architecture to dynamically measure and estimate the throughput perceived by a user during a connection in real-time. The complexity of distributed environments arise naturally because of the diversity of computing platforms, user preferences, incompatible protocols and legacy applications, as well as varying QoS requirements in dynamically changing wireless environments. The architecture of the present invention is based on a multi-tier agent architecture consisting of the mobile host (client) at the first tier, an Information Gateway (IGW) at the second tier, and application servers at the third or fourth tiers. Application agents serve as self-contained application interfaces to a specified application server, offering an application layer that seamlessly glues different services and applications together. These agents can be modeled as independent components implemented by Java Bean, DCOM, COBRA or other comparable architectures. The salient feature of agent-based middleware architecture is its adaptability to a constantly varying environment. The simplicity of managing such architectures provides transparency to users with smooth integration of various services, including the addition or removal of services or components.

FIG. 1 shows the system architecture according to the present invention, designed to service large mobile user communities, typically users in moving vehicles. The architecture comprises several access networks in which a mobile host may be located, an information gateway (IGW), and an application or media server. The IGW, serves as a gateway to forward requests from mobile hosts to application servers (including web servers) and to relay the corresponding responses to the mobile hosts. Communication between the IGW and the application server can be carried out over the internet. In accordance with the present invention, a request sent out by the mobile host is picked up by a wireless base station and routed to the IGW where user authentication may be performed and various services associated with the user may be granted. In this fashion, the IGW acts as a virtual firewall, fending off unauthorized users and ensuring availability of services to the subscribed user. The IGW may also perform as a proxy that relays requests to application servers and carries out the HTML transactions and caching functions.

The architecture shown in FIG. 1, comprises a multi-tier agent architecture, wherein the mobile host is at the first tier with access network connectivity, The IGW which is controlled by a third-party service vendor is at the second tier, and application servers are at the third or fourth tiers in the backbone network.

In accordance with the present invention, each user has an associated serving IGW which is located in the backbone. This association with the IGW may be static or may change based on user location, load balancing and other network constraints. Because the IGW acts as a filter for traffic flow to the mobile user, it is a desirable location to perform download rate control functions without impacting the backbone or carrier network functionalities, thus giving full control to the third-party service provider.

By using the architecture of the present invention the availability of throughput estimation is guaranteed and therefore provisioning of differentiated services and user preference based services is supported. By performing the throughput measurement a the IGW, the system of the present invention provides a more efficient distribution of resources, such as allocating more throughput for sessions with tighter loss and delay requirements.

The present invention also provides TEs capable of handling the unique behavior of the wireless environment. In particular, the TEs of the present invention have the following characteristics. The TEs of the present invention provide real-time estimation information. This is important because estimation information is highly volatile, and quickly obsolete when a mobile host moves. Further, the TEs of the present invention are individually tailored, e.g. end-to-end or peer-to-peer. This is important because the available link capacity from a mobile host to a server is affected significantly by the present location of the mobile host, terrain condition and base station coverage. In addition, the TEs of the present invention incur minimal overhead which is important in wireless networks because of limited wireless bandwidth.

The TEs of the present invention fall into two categories; i.e. passive and active estimators. Passive estimators are initiated and invoked by another process or request (e.g. content delivery rate-based estimators). A passive estimator is initiated upon receipt of a request from a mobile host. Then the IGW acting as the gateway, retrieves the host's IP address, and forwards probes with timestamps to the requester. The IGW measures the corresponding round trip time (RTT) and uses that measurement to estimate throughput. Active estimators are self-initiated (e.g. ICMP-based estimators). For example, an active estimator on the host-side may send data probes to the IGW in a periodic fashion. The obtained RTT measurement will then be used by the mobile host or the IGW for updating the corresponding throughput information for the specific user.

Several TEs based on different protocols are described below, all of which can be used in the present invention as will be more fully discussed below.

ICMP (Internet Control Message Protocol) is used to report network errors in IP datagram routing as well as flow control. An ICMP-based TE sends data probes, or ping packets, with varying sizes within the ICMP header to a destination host, each data probe being immediately returned to the source upon receipt by the destination host. Each data probe contains a sequence number and time stamp, so that when the source receives the response from the destination host, the RTT can be measured, thus providing a good indication of the network throughput. A major drawback to ICMP-based ping type estimators is that they can be used as a powerful tool to infringe network security, and therefore, web servers often prevent the servers from being pinged by disabling the corresponding ICMP services. The architecture of the present invention overcomes this drawback by configuring the IGW to always be ICMP-active, making the ICMP-based TE independent of various network security settings.

HTTP-based TEs consists of two components, one residing in the network and the other residing in the mobile host, the two components working together to provide an estimate of end-to-end system throughput. One of the components, called the HTTP-estimator client, serves as a simple client that sends an HTTP request to the other component, called the HTTP-estimator server. The request message specifies the size of the response, so that upon receipt, HTTP-estimator server will send a response with the size specified by the HTTP-estimator client, which then measures the RTT. The collected measurement information can be kept in memory and used for monitoring purposes. In the system of the present invention, an HTTP-based TE can act passively or actively and either the IGW or the mobile host can include the HTTP-estimator client component. It is important in the wireless environment that the system be capable of saving the past as well as present information on throughput estimation for each active user. This property is referred to as state persistence and contrasts with the stateless approach adopted by traditional WWW servers. In the architecture of the present invention, the state persistency is maintained by a data entry with a very small size for each user which may be stored on the IGW. In particular, a thread is assigned to each incoming HTTP request and the host IP is used as the unique user identifier.

A TCP trace TE is based on analyses of TCP trace which indicates that the actual measure of time for content delivery could be used as a good indicator of end-to-end network traffic. TCP path analysis can be used to pinpoint the processing delays caused by various factors. In particular, a HTTP connection can be separated into three time frames; connection establishment, bulk data transfer and connection termination and it has been shown through detailed analysis, that for a lightly loaded system, server-induced delay is a dominant factor at HTTP connection establishment, while network-induced delay is a dominant factor at bulk data transfer time. In the architecture of the present invention, the network-induced delay can be considered as a rough estimate of the end-to-end throughput between IGW and a mobile host. Further, using a TCP trace type TE in the system of the present invention overcomes the disadvantage that only a one-way path (downlink) capacity estimation is provided. In particular, the architecture of the present invention takes system load into account. Therefore, detailed information about the root causes of delays, and identification of network-induced and system load-induced delays is provided, resulting in the accurate end-to-end estimation of the network traffic throughput between IGW and a mobile host.

Simple Network Management Protocol (SNMP), is the de facto standard for network management, offering the hierarchical structure referred to as Management Information Bases (MIB) to specify network and application objects, and defining a set of operations on the managed objects. In a model for SNMP operation, a master agent is a process running on a managed node to exchange SNMP information, and a subagent is a process that is able to access various management information about application-related objects specified by the MIB. The subagent retrieves status information of the managed objects via the master agent, synchronously or asynchronously. Known TEs for SNMP rely on the assumption that good performance at the server indicates good end-to-end throughput, as the deterioration of server performance in terms of response time and network throughput will indiscriminately affect all mobile clients. However, this is not the case when using the IGW architecture of the present invention, because latency can be incurred at the mobile host, the server or the network. Pinpointing the precise causes of poor system performance is difficult because system performance is influenced by many factors such as CPU, memory, disk, network bandwidth, etc. Therefore, in accordance with the present invention an SNMP-based TE uses statistical network traffic information. In particular, information such as total process connection (number of active TCP connections, number of active UDP connections), TCP statistics information (number of segments sent, number of segments received, number of current established sessions, number of segments retransmitted), UDP statistics information (number of datagrams received, number of datagrams sent, number of datagrams dropped, received packets discarded), IP statistics information (number of packets received, number of packets delivered), and ICMP statistics information (number of message sent, number of message received) can be used.

In the architecture of the present invention, the IGW serves as the only interface to the internet for the mobile host, and therefore all traffic must go through the IGW. By using the statistical information in conjunction with a timer, the overall network traffic rate at the IGW can be derived and this derivation serves as a rough estimation for the end-to-end throughput between IGW and mobile hosts.

The present invention also provides algorithms for estimating throughput in wireless networks. In particular, using a set of algorithms according to the present invention, a weighted average throughput experienced by the user's application is calculated. The algorithms of the present invention have important advantages and distinctions from estimations used for wired networks. In particular, the algorithms of the present invention track real-time throughput with minimal overhead to provide control in limited wireless bandwidth environments. As a result, reasonable quality is provided and injection of too many additional packets and overloading a wireless connection that is already slow is avoided.

The algorithms of the present invention are used to estimate the real-time path throughput between the IGW and the user, by measuring the rate at which information is received at the client's application. In particular, let $\Delta t$ be the measurement interval and let $\tau$ be the current measurement time. The measured throughput rate sample is then $R(\tau)=M/\Delta t$, where M is the number of messages that arrive during the time interval $(\tau-\Delta t, \tau)$. Throughput is then estimated for an application flow using equation (1).

$$\hat{R}(\tau)=\alpha(\tau)R(\tau)+(1-\alpha(\tau))E[R_{\tau-\Delta t}] \quad (1)$$

This estimated value is a weighted average of two components, the current measured value and the average of the last K−1 measured values as shown in equation (2).

$$E[R_{\tau-\Delta t}] = \frac{1}{K-1}\sum_{k=1}^{K-1} R(\tau - (K-k)\Delta t) \quad (2)$$

The weight value $\alpha(\tau)$ is then calculated as the average fractional difference between consecutive measurements points for the last N−1 measurements as shown in equation (3).

$$\alpha(\tau) = \frac{1}{N-1}\sum_{n=1}^{N-1} \frac{abs[R(\tau - (N-n-1)\Delta t) - R(\tau - (N-n)\Delta t)]}{\max[R(\tau - (N-n-1)\Delta t), R(\tau - (N-n)\Delta t)]} \quad (3)$$

When a user session starts, the throughput estimator must initially collect a number of input rate measurements, or samples, before the estimation begins. The number of samples needed is max(N,K). The client will then periodically send the last estimated and last measured throughput values to the IGW as feedback. For example, assume the last measured and estimated values are recorded at time γ, then the user would forward $\hat{R}(\gamma)$, $R(\gamma)$ to the IGW. Additionally, estimated values can be sent before the periodic update time, if the client determines that the estimated throughput varies significantly from the current measured value.

As noted above, to accommodate the wide range of service rates, the IGW acts as the intermediate node for all communications between the mobile user and application servers. The IGW download rate control algorithm according to the present invention dynamically adjusts the content download in response to the varying path throughput in order to minimize the session information loss and latency. The IGW adjusts the sending rate using standard methods such as leaky bucket policing.

Continuing with the example above, the IGW will receive the last estimated throughput value and measured throughput value from the mobile user at time γ. The IGW then calculates the new download rate for current time t, $R_{DL}(t)$ for the particular application flow. The actual path throughput $R_A(t)$ is a function of the network and therefore, is unknown but can be approximated by considering the measured rate at which the user is receiving. If the download rate is greater than the actual throughput, then the measured throughput rate at the user side will be at most $R_A(t)$. However, if the download rate is less than $R_A(t)$, the receiving rate measured at the user will be at most $R_{DL}(t)$. A new download rate is calculated using equation (4), where the sensitivity parameter β and the increment parameter δ are engineering parameters based on real world testing and sampling of wireless network throughput fluctuations and device capabilities.

$$\text{if } |R(\gamma)-\hat{R}(\gamma)| \begin{cases} > \beta, & \text{then } R_{DL}(t) = \max[R(\gamma), \hat{R}(\gamma)] \\ < \beta, & \text{then } R_{DL}(t) = \max[R(\gamma), \hat{R}(\gamma)] + \delta \end{cases} \quad (4)$$

Based on the possible relationships between the throughput, available throughput and download rates, the conditions set forth in equation (4) are used to adjust the download rate. Equation (4) is used to approximate the relation between the measured throughput, estimated throughput, download rate and the actual path throughput. For example, if the difference between the estimated and the measured throughput values is <β, then the two values are comparable because the download rate has not exceeded the actual path throughput. The IGW can then send at a higher rate because the available path throughput may be underutilized, with the new download rate being based on the maximum of the measured and estimated throughput value plus the incremental amount. Since the estimated and measured throughput are relatively close, the maximum of these two values is used as the baseline for the updated download rate to make the most use of the path throughput. If the measured and estimated values are not comparable, then the actual path throughput is varying, causing the measured throughput rates to vary as well, in which case the maximum of measured and estimated throughput is used as the new download rate. The estimated throughput values and the measured rates will become comparable again if the actual throughput fluctuations are limited.

During a session, the user may move through heterogeneous wireless networks which may cause large capacity fluctuations. For example, a user may move from an 802.11b network to a CDMA network, causing a throughput drop of a factor of 10. To handle dramatic throughput changes as users traverse heterogeneous networks, the user will trigger the estimation algorithm and the IGW download control to restart with the nominal service rate of the network as the baseline download rate value. A user will recognize that handoff into a new network has occurred through network layer changes such as a new IP address, or a new active network card for multi-port devices. The decision to start or restart the algorithm in a new network may depend on the type of network. For example, time in high-speed picocell networks may be very short-lived and estimation values would become quickly outdated. Therefore, it may not be useful to perform throughput control while in this type of network.

The sensitivity parameter and the increment parameter are important elements of equation (4). With a high sensitivity parameter β, the download rate control becomes insensitive to path variations resulting in usage gain of the actual path throughput. However, very large β ignores large variations and may result in download rates which exceed the actual throughput, causing loss. The increment parameter, δ, should be large enough to take advantage of the available throughput but small enough that if the available throughput is reduced, the impact on the receiving rate at the user is limited. The increment parameter should be chosen to be less than the sensitivity parameter to avoid excessive oscillation in the adjusted download rate.

The architecture of the present invention provides end-to-end throughput estimation for each mobile user by means of various TEs operating in different protocols and environments. An aggregate TE is also defined by the present invention providing overall information on the throughput performance of the network. End-to-end throughput estimation is an indispensable component in a QoS system architecture because of its ability to anticipate the delay in serving a request from a mobile host based on available resources. The real-time estimation information provided by the present invention serves as crucial feedback information to QoS managers for prioritizing user requests as well as service adaptation depending on the overall resource availability and user service subscription. In particular, the proposed throughput control approach can be utilized to provide increased throughput when high path throughput is available and limit download traffic when the path throughput is low.

The application-layer approach of the present invention enables the throughput control to be independent of network technologies and does not require any modifications of network equipment (e.g., routers, base stations), however, that additional software at the mobile host and at the IGW will be required.

The use of the present invention is technically feasible even for a large user base because of the low overhead in maintaining individual end-to-end information and the efficient management of information. Further the present invention provides a robust and flexible infrastructure in obtaining the end-to-end throughput estimation and more accurate estimations by information synthesis from multiple sources using various protocols. These estimates, in turn, can be used to determine the adjustment to the service rate, if any, in order to properly utilize available network bandwidth.

It is anticipated that other embodiments and variations of the present invention will become readily apparent to the skilled artisan in the light of the foregoing description and examples, and it is intended that such embodiments and variations likewise be included within the scope of the invention as set out in the appended claims.

What is claimed is:

1. A method of optimizing download rate to a mobile host from an application server in a telecommunications network, said method comprising:

providing an information gateway between said mobile host and said application server capable of adjusting said download rate;

measuring a throughput rate using the following equation $R(\tau)=M/\Delta t$, wherein $R(\tau)$ is the measured throughput rate, $\Delta t$ is a measurement time interval, $\tau$ be a current measurement time and M is a number of messages that arrive during the time interval;

calculating an estimated throughput rate for an application flow using the following equation $\hat{R}(\tau)=\alpha(\tau)R(\tau)+(1-\alpha(\tau))E[R_{\tau-\Delta t}]$, wherein the estimated value $E[R_{\tau-\Delta t}]$ is a weighted average of the current measured value and the average of the last K-1 measured values where K is the index of the current measured value, and weight value $\alpha(\tau)$ is an average fractional difference between consecutive measurements points;

calculating the difference between said measured throughput rate and said estimated throughput rate and if said difference is less than a predetermined sensitivity parameter, then increasing said download rate through said information gateway by a predetermined incremental amount.

2. A method according to claim 1, wherein said predetermined incremental amount is less than said predetermined sensitivity parameter.

3. A method according to claim 1, wherein said step of calculating an estimated throughput rate is carried out at said information, gateway.

4. A method according to claim 1, wherein said step of calculating an estimated throughput rate is carried out at said mobile host.

5. A method according to claim 1, wherein said step of calculating the difference is carried out at said information gateway.

* * * * *

UNITED STATES PATENT AND TRADEMARK OFFICE
CERTIFICATE OF CORRECTION

PATENT NO. : 7,477,602 B2
APPLICATION NO. : 10/815605
DATED : January 13, 2009
INVENTOR(S) : Ling et al.

It is certified that error appears in the above-identified patent and that said Letters Patent is hereby corrected as shown below:

In The Specification

In Column 4, Line 22, delete "connectivity," and insert -- connectivity. --, therefor.

In Column 4, Line 39, delete "a the" and insert -- of the --, therefor.

In The Claims

In Column 10, Line 26, in Claim 3, delete "information," and insert -- information --, therefor.

Signed and Sealed this
Eighteenth Day of November, 2014

Michelle K. Lee
*Deputy Director of the United States Patent and Trademark Office*